US008239243B2

(12) United States Patent  
Shin

(10) Patent No.: US 8,239,243 B2  
(45) Date of Patent: Aug. 7, 2012

(54) APPARATUS AND METHOD FOR OPERATING SUPPLY CHAIN MANAGEMENT IN MOBILE TERMINAL

(75) Inventor: Dong-Soo Shin, Hwaseong-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 279 days.

(21) Appl. No.: 12/556,260

(22) Filed: Sep. 9, 2009

(65) Prior Publication Data

US 2010/0125488 A1 May 20, 2010

(30) Foreign Application Priority Data

Nov. 20, 2008 (KR) .................. 10-2008-0115694

(51) Int. Cl.
*G06Q 10/00* (2012.01)
(52) U.S. Cl. ........ 705/7.29; 705/64; 705/7.11; 705/7.31
(58) Field of Classification Search .................. 705/50, 705/59, 7.11, 7.31; 713/2
See application file for complete search history.

(56) References Cited

U.S. PATENT DOCUMENTS

| | | | |
|---|---|---|---|
| 5,537,460 A | | 7/1996 | Holliday, Jr. et al. |
| 5,844,808 A | * | 12/1998 | Konsmo et al. ............... 700/244 |
| 5,999,812 A | | 12/1999 | Himsworth |
| 6,189,100 B1 | * | 2/2001 | Barr et al. ...................... 713/182 |
| 6,311,055 B1 | * | 10/2001 | Boltz ........................ 455/414.1 |
| 6,332,127 B1 | * | 12/2001 | Bandera et al. ............ 705/14.55 |
| 6,421,777 B1 | * | 7/2002 | Pierre-Louis et al. ............ 713/2 |
| 6,480,557 B1 | * | 11/2002 | Rog et al. ...................... 375/349 |
| 7,073,050 B2 | * | 7/2006 | Chen et al. ........................ 713/1 |
| 7,590,837 B2 | * | 9/2009 | Bhansali et al. .................. 713/2 |
| 2002/0161664 A1 | * | 10/2002 | Shaya et al. .................... 705/26 |
| 2004/0186760 A1 | * | 9/2004 | Metzger ............................ 705/7 |
| 2006/0031182 A1 | * | 2/2006 | Ryan et al. ...................... 706/50 |
| 2007/0124199 A1 | * | 5/2007 | Robinson et al. ............... 705/13 |
| 2008/0013696 A1 | * | 1/2008 | Motley et al. ................... 379/45 |
| 2008/0086391 A1 | * | 4/2008 | Maynard et al. ................ 705/28 |
| 2008/0287109 A1 | * | 11/2008 | Marett et al. ............... 455/414.1 |
| 2010/0004996 A1 | * | 1/2010 | Fujita et al. ................ 705/14.64 |
| 2010/0042510 A1 | * | 2/2010 | Zeinfeld et al. ................. 705/26 |
| 2010/0125488 A1 | * | 5/2010 | Shin ............................... 705/10 |
| 2010/0217723 A1 | * | 8/2010 | Sauerwein et al. ........... 705/337 |
| 2010/0268589 A1 | * | 10/2010 | Wesby ....................... 705/14.25 |
| 2011/0196724 A1 | * | 8/2011 | Fenton et al. .............. 705/14.16 |

FOREIGN PATENT DOCUMENTS

| | | |
|---|---|---|
| KR | 10-2007-0069565 A | 7/2007 |
| KR | 10-2008-0042210 A | 5/2008 |

* cited by examiner

*Primary Examiner* — Mamon Obeid  
(74) *Attorney, Agent, or Firm* — Jefferson IP Law, LLP

(57) ABSTRACT

An apparatus and method for effectively operating Supply Chain Management (SCM) emerging as a management scheme preferred by mobile terminal manufacturers are provided. The method includes, upon detection of initial booting, gathering at least one of mobile terminal identifier information, product information, and subscriber location information, generating a sales information message comprising the gathered information, and transmitting the generated sales information message. Accordingly, an SCM system is reliably implemented in advance and determines statistical data regarding a time of sales of the mobile terminal. Further, the SCM system may determine statistical data for preferred models and colors of the mobile terminal. In addition, the determined statistical data may be utilized as marketing information or may be usefully utilized for point-of-sales inventory management by performing demand prediction.

10 Claims, 4 Drawing Sheets

APPARATUS AND METHOD FOR OPERATING SUPPLY CHAIN MANAGEMENT IN MOBILE TERMINAL

PRIORITY

This application claims the benefit under 35 U.S.C. §119(a) of a Korean patent application filed in the Korean Intellectual Property Office on Nov. 20, 2008 and assigned Serial No. 10-2008-0115694, the entire disclosure of which is hereby incorporated by reference.

BACKGROUND OF THE INVENTION

1. Field of the Invention

The present invention relates to an apparatus and method for effectively operating Supply Chain Management (SCM). More particularly, the present invention relates to an apparatus and method in which a mobile terminal generates a sales information message to determine statistical data.

2. Description of the Related Art

With the growing speed of technical developments and rapid changes in business management environments, businesses are competing aggressively to achieve competitive advantages. Such a trend is not limited to local businesses. For example, most businesses, particularly large businesses, are concerned about achieving competitive advantages with the aid of Supply Chain Management (SCM).

Information technology, necessary to support the digital era, has rapidly been developed and is widely available. Using such information technology, such as the Internet and networking technology, businesses may interoperate with one another at a low cost. In addition, many businesses maximize the efficiency of business processes by implementing an Enterprise Resource Planning (ERP) system, and effectively manage their customer information by implementing a customer relation management system. The SCM is an innovative management concept for maximizing efficiency by integrating logistics and business practices related to internal and external demand prediction procedures by utilizing the developed information technology.

An SCM system operated by conventional mobile terminal manufacturers periodically performs demand prediction and statistical data determination on a periodic basis, for example weekly or monthly. In this case, a sales person manually updates the quantity of sales in their shop, and sales corporations update the quantity of deliveries in respective countries. Accordingly, the statistical data determination and demand prediction may not be performed on a real time basis in each region. Moreover, the updating of information requires manual input of data which may lead to errors due to an incorrect input.

Accordingly, there is a need for an apparatus and method in which a mobile terminal effectively operates a Supply Chain Management (SCM).

SUMMARY OF THE INVENTION

An aspect of the present invention is to address at least the above-mentioned problems and/or disadvantages and to provide at least the advantages described below. Accordingly, an aspect of the present invention is to provide an apparatus and method in which a mobile terminal effectively operates Supply Chain Management (SCM) emerging as a business management scheme used by mobile terminal manufacturers.

Another aspect of the present invention is to provide an apparatus and method in which a mobile terminal generates a sales information message to determine statistical data by gathering mobile terminal identifier information, product information, and subscriber location information according to whether a function for transmitting the sales information message is set when booting is initially performed after purchasing, and then transmits the generated sales information message to an SCM system.

In accordance with an aspect of the present invention, a method of transmitting a sales information message of a mobile terminal is provided. The method includes, upon detection of initial booting, gathering at least one of mobile terminal identifier information, product information, and subscriber location information, generating a sales information message comprising the gathered information, and transmitting the generated sales information message.

In accordance with another aspect of the present invention, an apparatus for transmitting a sales information message in a mobile terminal is provided. The apparatus includes a storage unit for storing at least one of mobile terminal identifier information, product information, and subscriber location information, and a sales information message generator/transmitter for extracting any one of the mobile terminal identifier information, the product information, and the subscriber location information from the storage unit upon detection of initial booting, for generating a sales information message by gathering the extracted information, and for transmitting the generated sales information message.

In accordance with still another aspect of the present invention, a method of operating SCM in a wireless communication system is provided. The method includes, by a mobile terminal, generating a sales information message by gathering at least one of mobile terminal identifier information, product information upon detection of initial booting, and subscriber location information, and transmitting the generated sales information message to an address of an SCM database server, by the SCM database server, transmitting the sales information message from the mobile terminal to an SCM system, and by the SCM system, determining statistical data using the sales information message received from the mobile terminal via the SCM database server.

In accordance with yet another aspect of the present invention, an apparatus for operating SCM in a wireless communication system is provided. The apparatus includes a mobile terminal for generating a sales information message by gathering at least one of mobile terminal identifier information, product information, and subscriber location information upon detection of initial booting, and for transmitting the generated sales information message to an address of an SCM database server, the SCM database server for transmitting the sales information message from the mobile terminal to an SCM system, and the SCM system for determining statistical data using the sales information message received from the mobile terminal via the SCM database server.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
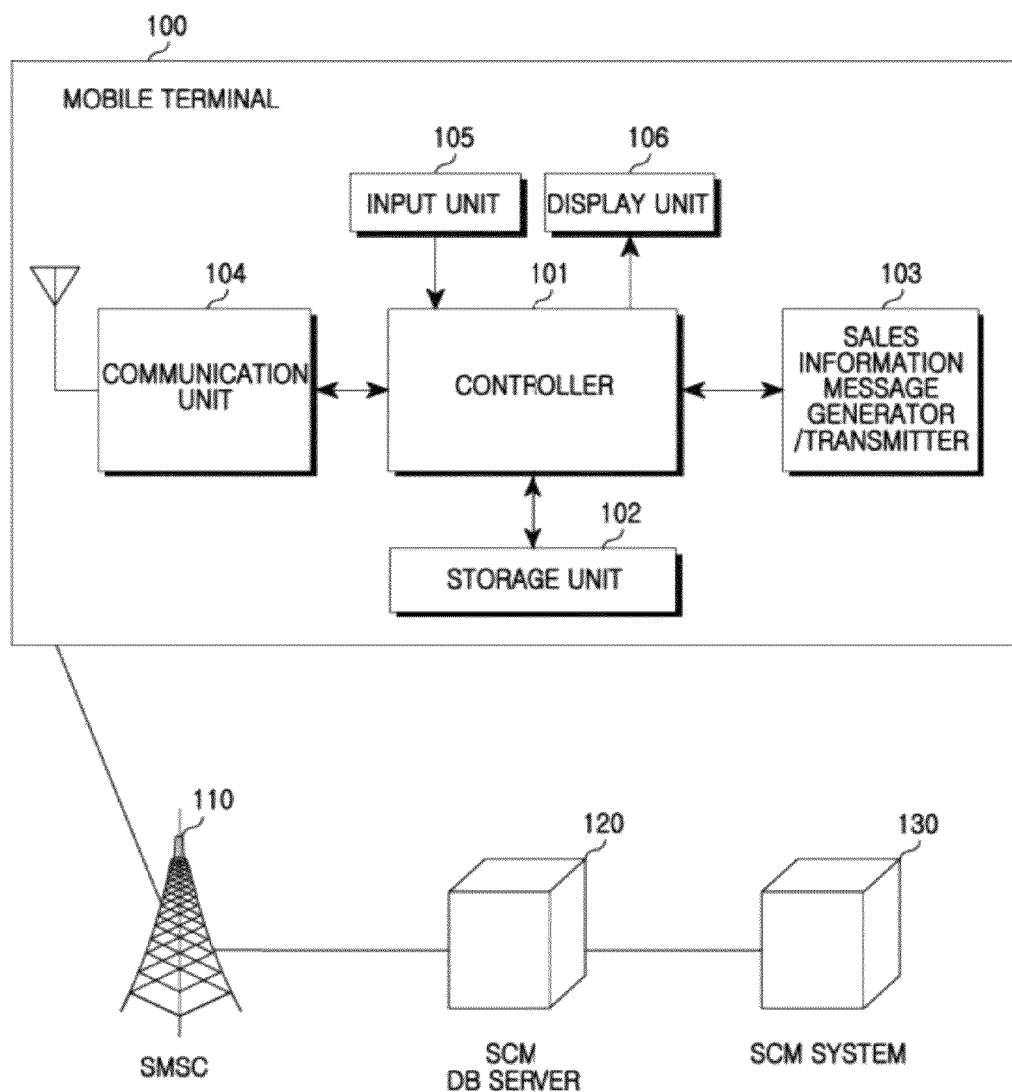
FIG. 1 is a block diagram illustrating a network structure and a mobile terminal structure according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention will be described below with reference to the accompanying drawings. In the following description, well-known functions or constructions are not described in detail since they would obscure the invention in unnecessary detail.

Exemplary embodiments of the present invention described below relate to an apparatus and method for effectively operating Supply Chain Management (SCM) which is emerging as a management scheme used by mobile terminal manufacturers. More particularly, an apparatus and method are provided in which a mobile terminal generates a sales information message, which is used to determine statistical data, by gathering information about a mobile terminal and transmitting the information to an SCM system. The information gathered about the mobile terminal may include mobile terminal identifier information, product information, subscriber location information and the like. Also, the information is gathered and the sales information message is transmitted according to whether a function for transmitting the sales information message is set when booting is initially performed after purchasing.

The SCM system, according to an exemplary embodiment of the present invention described below, may be classified into a general SCM system used by an operator to determine statistical data of mobile terminals available in a local market and a global SCM system used by a manufacturer to determine statistical data of mobile terminals available in both local and overseas markets. An operator who implements a general SCM system has a unique SCM DataBase (DB) server for each operator. That is, a unique SCM DB server exists for each operator. An address of the SCM DB server is assigned to a mobile terminal, and the mobile terminal transmits a sales information message to that address. Accordingly, the general SCM system of the operator may determine statistical data by collectively gathering the sales information messages from mobile terminals available in the local markets. A manufacturer who implements a global SCM system has a unique SCM DB server defined for each manufacturer by each operator. That is, a unique SCM DB server exists for each manufacturer. An address of the SCM DB sever is assigned to a mobile terminal, and the mobile terminal transmits a sales information message to that address. Accordingly, the global SCM system of each manufacturer may determine statistical data by collectively gathering the sales information messages from mobile terminals available in both the local and overseas markets.

FIG. 1 is a block diagram illustrating a network structure and a mobile terminal structure according to an exemplary embodiment of the present invention.

Referring to FIG. 1, a network structure includes a mobile terminal 100, a Short Message Service Center (SMSC) 110, an SCM DB server 120, and an SCM system 130. The mobile terminal 100 includes a controller 101, a storage unit 102, a sales information message generator/transmitter 103, a communication unit 104, an input unit 105, and a display unit 106.

The controller 101 of the mobile terminal 100 controls and processes an overall operation of the mobile terminal 100. More particularly, the controller 101 controls and processes functions for generating a sales information message by gathering information about the mobile terminal for transmission to SMSC 110. For example, the controller 101 may control to gather specific information such as mobile terminal identifier information, product information, subscriber location information and the like. Moreover, the information is gathered according to whether a function for transmitting the sales information message is set when booting is initially performed after purchasing. Furthermore, the controller 101 controls to transmit the generated sales information message to the SMSC 110.

The storage unit 102 stores a variety of information and a program required for the overall operation of the mobile terminal 100. More particularly, the storage unit 102 stores and manages the mobile terminal identifier information, the product information, the subscriber location information and other information about the mobile terminal. The mobile terminal identifier information may include an International Mobile station Equipment Identity (IMEI), an Electronics Serial Number (ESN) and the like. The product information may include mobile terminal information such as a model name and a color code, and may include operator information such as an operator identifier code (i.e., an operator code or a market type). If the mobile terminal is equipped with a Global Positioning System (GPS) module, the subscriber location information may include latitude and longitude coordinates as location information received from a GPS satellite or address information indicating a current location determined based on the latitude and longitude coordinates. If the mobile terminal is not equipped with a GPS module, the subscriber location information may include a cell IDentifier (ID) of a base station to which a subscriber belongs.

The sales information message generator/transmitter 103 generates a sales information message in a short message format by extracting and gathering information about the mobile terminal. For example, the sales information message generator/transmitter 103 may extract and gather the mobile terminal identifier information, the product information, the subscriber location information, or other information and transmit the generated sales information message to the SMSC 110. Also, the extracting and gathering of the information by the sales information message generator/transmitter 103 may be executed according to whether a function for transmitting the sales information message is set when booting is initially performed after purchasing the mobile terminal 100. In this case, an address of the SCM DB server is pre-assigned to the sales information message generator/transmitter 103. The sales information message generator/transmitter 103 transmits the sales information message using the pre-assigned address as a receiving-side address.

The communication unit 104 processes a signal transmitted and received through an antenna.

The input unit 105 may be constructed of a plurality of letter keys, numeral keys, function keys, and the like and provides key input data corresponding to a user input to the controller 101.

The display unit 106 displays information such as state information which is generated while the mobile terminal 100 operates, symbols and alpha-numeric characters, moving and still pictures, etc. The display unit 106 may be a color Liquid Crystal Display (LCD). If the LCD is provided as a touch screen, the display unit 106 may perform a part or all of the functions of the input unit 105.

The SMSC 110 receives a short message from the mobile terminal 100 and transmits the short message to a corresponding recipient. More particularly, the SMSC 110 evaluates a receiving-side address of the short message received from the mobile terminal 100. If the evaluated receiving-side address is the address of the SCM DB server, the SMSC 110 determines that the short message is a sales information message for determining statistical data rather than a general short message, and transmits the sales information message to the SCM DB server 120.

The SCM DB server 120 transmits the sales information message received from the SMSC 110 to the SCM system 130. For an operator that implements a general SCM system, the SCM DB server 120 is an SCM DB server unique for the operator, and the SCM DB server 120 transmits the sales information message to the general SCM system of the operator. For a manufacturer that implements a global SCM system, the SCM DB server 120 is an SCM DB server unique for the manufacturer. In that case, the SCM DB server 120 gathers the sales information message received from the SMSC 110 for each operator, and transmits the gathered sales information message to the global SCM system of the manufacturer.

The SCM system 130 may be implemented as a general SCM system or a global SCM system, and determines statistical data using the sales information message received from the SCM DB server 120. That is, the SCM system 130 may determine statistical data regarding a time of sale of the mobile terminal 100 by recognizing a time of receiving the sales information message, and may determine statistical data for regionally or nationally preferred models and colors of the mobile terminal 100 using a model name, a color code, and subscriber location information included in the sales information message. The statistical data determined as described above may be utilized as marketing information or may be usefully utilized for point-of-sales inventory management by performing demand prediction.

Figure 2:
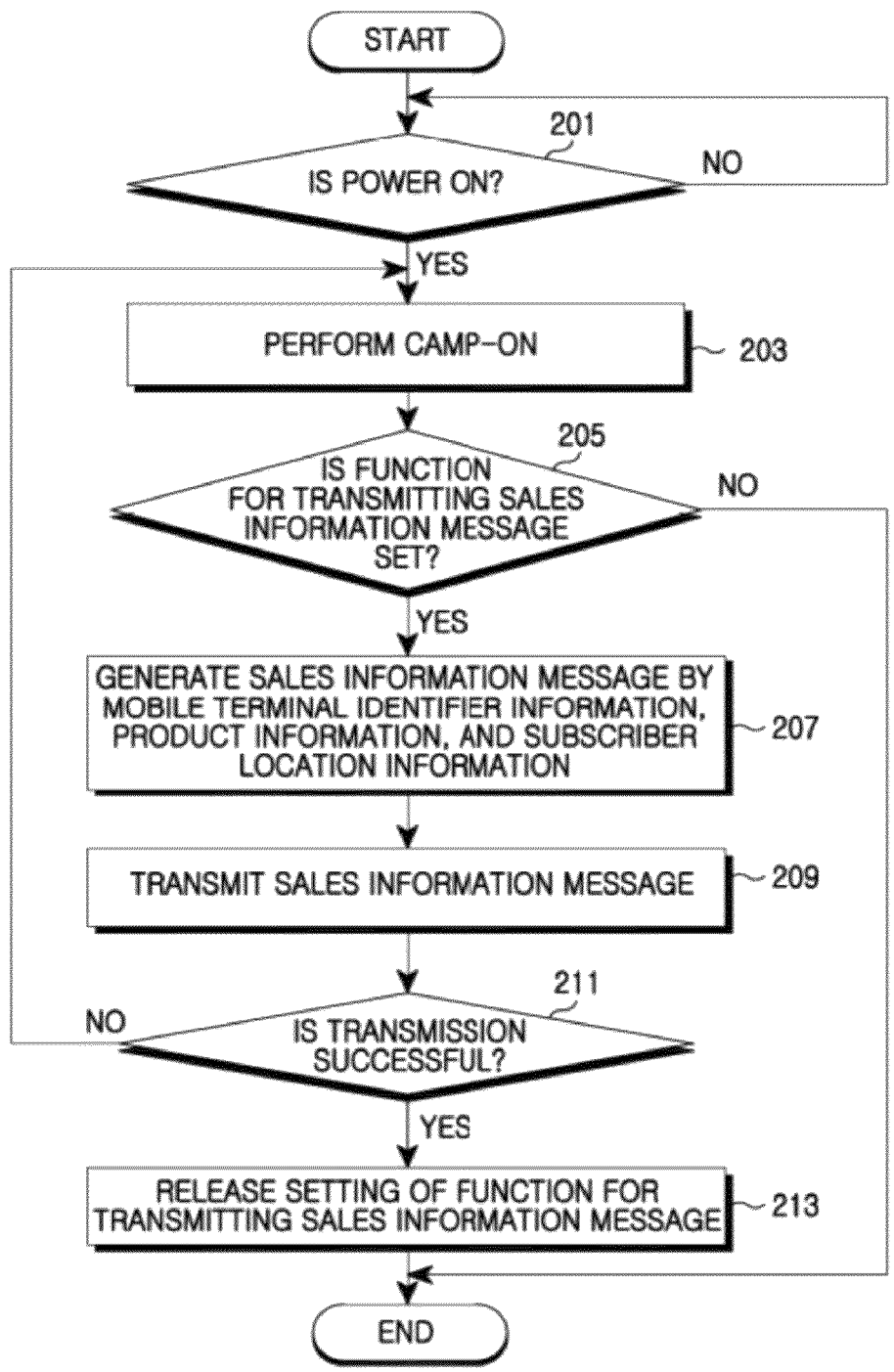
FIG. 2 is a flowchart illustrating a method of generating and transmitting a sales information message in a mobile terminal according to an exemplary embodiment of the present invention.

FIG. 2 is a flowchart illustrating a method of generating and transmitting a sales information message in a mobile terminal according to an exemplary embodiment of the present invention.

Referring to FIG. 2, in step 201, the mobile terminal determines whether it is initially powered on after purchasing according to key manipulation of a user, that is, whether initial booting is detected.

If it is determined that the mobile terminal is initially powered on after purchasing in step 201, the mobile terminal performs a camp-on operation on a network in step 203. In step 205, the mobile terminal determines whether a function for transmitting a sales information message is set. If it is determined in step 205 that the function for transmitting the sales information message is not set, the procedure of FIG. 2 ends.

Otherwise, if it is determined in step 205 that the function for transmitting the sales information message is set, the mobile terminal generates the sales information message in step 207 by gathering information about the mobile terminal. For example, the mobile terminal may gather mobile terminal identifier information, product information, subscriber location information and the like. In step 209, the mobile terminal transmits the generated sales information message to a server. For an operator that implements a general SCM system, the mobile terminal transmits the generated sales information message to an SCM DB server address of the operator. For a manufacturer that implements a global SCM system, the mobile terminal transmits the generated sales information message to an SCM DB server address of the manufacturer.

In step 211, the mobile terminal determines whether the sales information message is successfully transmitted. Whether the sales information message is successfully transmitted may be determined by receiving a response message for the sales information message from the server.

If it is determined in step 211 that transmission of the sales information message is unsuccessful, the mobile terminal returns to step 203 and subsequent steps are repeated. Otherwise, if it is determined in step 211 that transmission of the sales information message is successful, the mobile terminal proceeds to step 213 and releases the setting of the function for transmitting the sales information message so that the sales information message is not additionally transmitted during the life cycle of the mobile terminal. Accordingly, the same sales information message is not retransmitted even if the mobile terminal is rebooted some time later.

Thereafter, the procedure of FIG. 2 ends.

Figure 3:
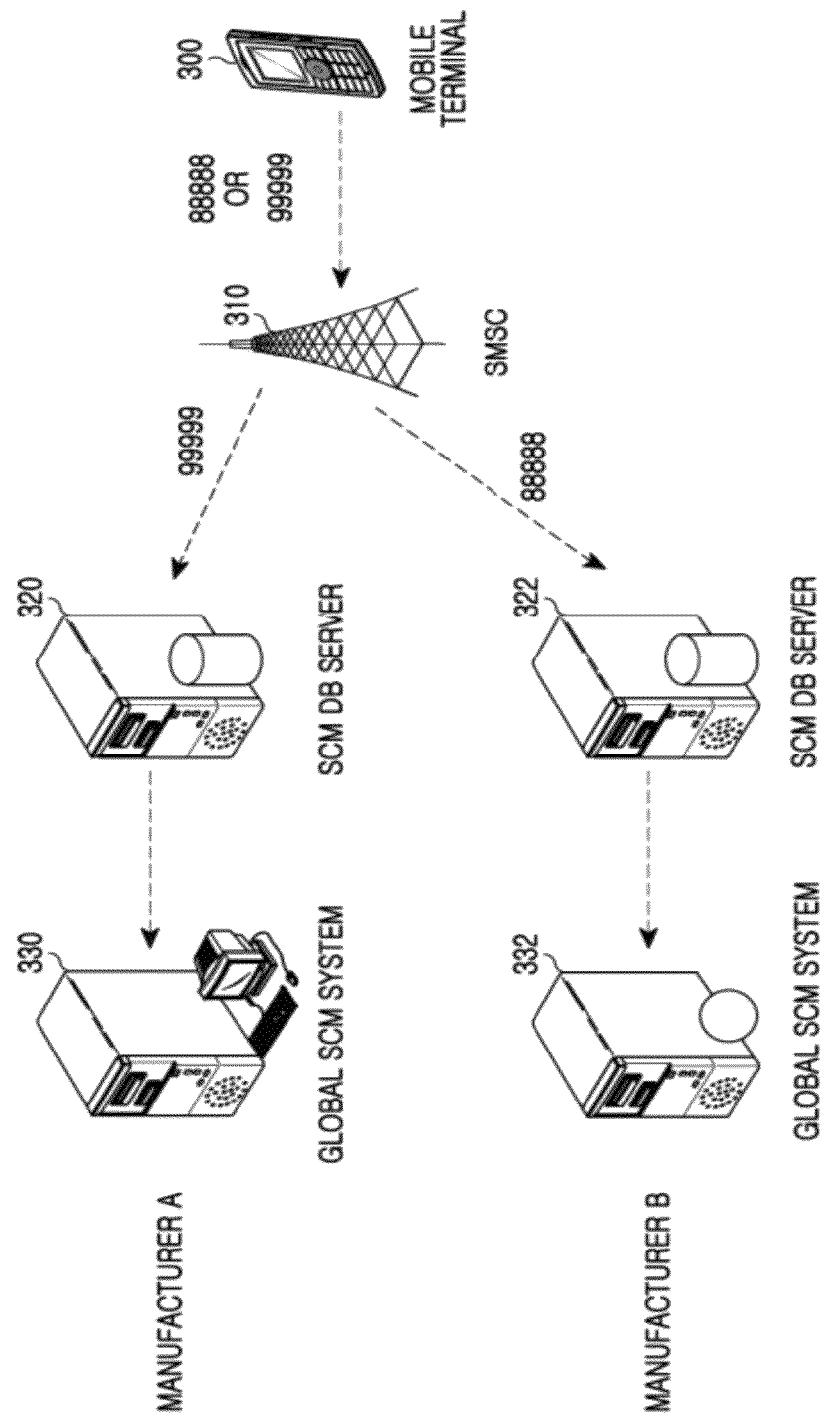
FIG. 3 is an example in which a mobile terminal transmits a sales information message using an address of a Supply Chain Management (SCM) DataBase (DB) server unique for each manufacturer when a global SCM system is implemented according to an exemplary embodiment of the present invention.

FIG. 3 is an example in which a mobile terminal transmits a sales information message using an address of an SCM DB server unique for each manufacturer when a global SCM system is implemented according to an exemplary embodiment of the present invention.

Referring to FIG. 3, using a receiving-side address of a short message received from a mobile terminal 300, an SMSC 310 determines whether the short message is a general short message or a sales information message for determining statistical data. If it is determined that the message is a sales information message, the SMSC 310 transmits the sales information message to SCM DB servers 320 and 322 of corresponding manufacturers.

For example, assume that a manufacturer A has an SCM DB server's address of 99999 and a manufacturer B has an SCM DB server's address of 88888. In this case, if a short message received from the mobile terminal 300 has a receiving-side address of 99999, the SMSC 310 determines that the short message received from the mobile terminal 300 is a sales information message for the manufacturer A, and transmits the sales information message to the SCM DB server 320 of the manufacturer A. In this case, the SCM DB server 320 of the manufacturer A gathers the sales information message received from the SMSC 310 for each operator and transmits the sales information message to a global SCM system 330. Accordingly, the global SCM system 330 of the manufacturer A may determine statistical data using the gathered sales information message.

If the short message received from the mobile terminal 300 has a receiving-side address of 88888, the SMSC 310 determines that the short message received from the mobile terminal 300 is a sales information message for the manufacturer B, and transmits the sales information message to the SCM DB server 322 of the manufacturer B. In this case, the SCM DB server 322 of the manufacturer B gathers the sales information message received from the SMSC 310 for each operator and transmits the gathered sales information message to a global SCM system 332 of the manufacturer B. Thus, the global SCM system 332 of the manufacturer B may determine statistical data using the gathered sales information message.

Figure 4:
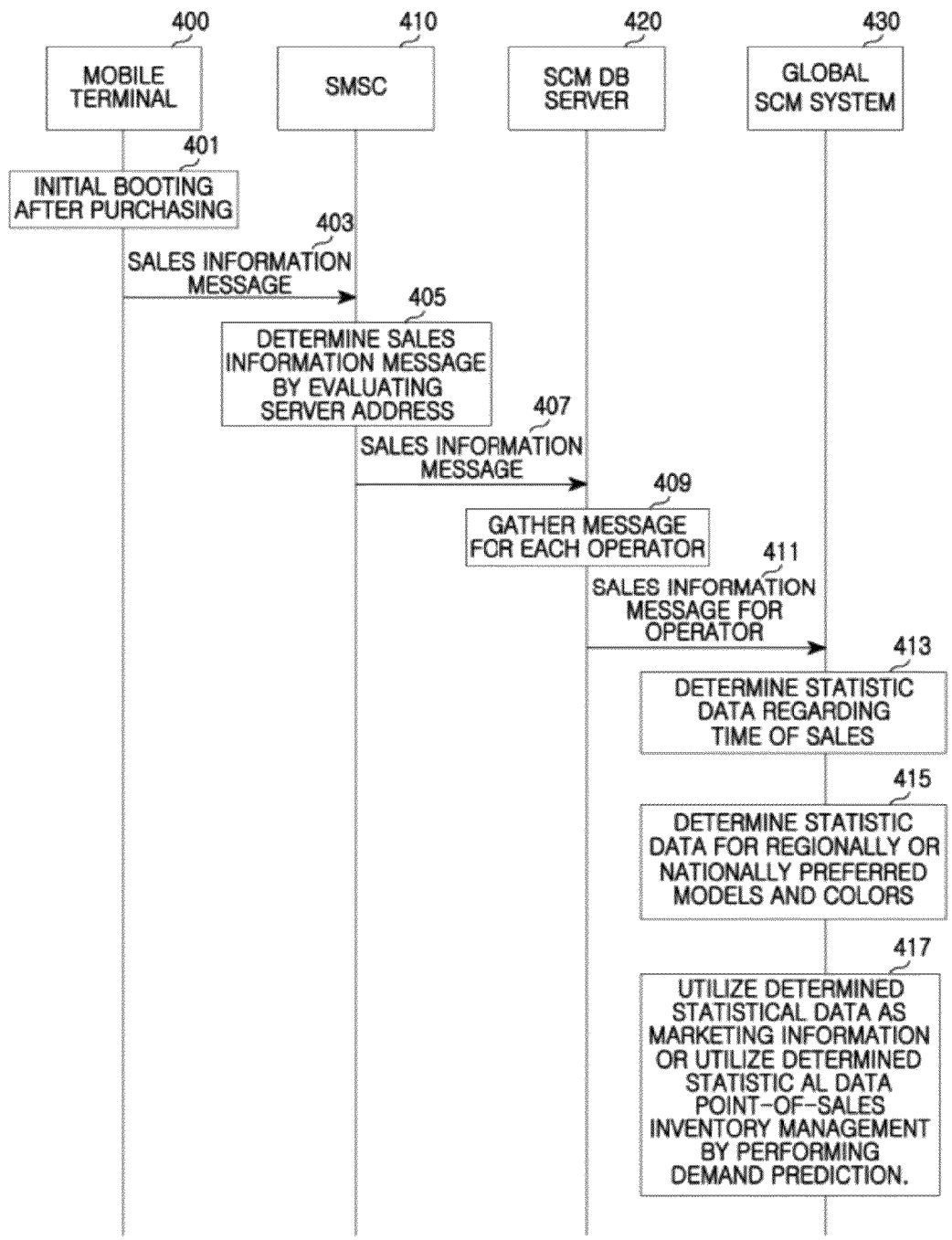
FIG. 4 is a signal flow diagram of a method in which, in a case where a global SCM system is implemented, a mobile terminal transmits a sales information message using an address of an SCM DB server unique for each manufacturer, and a global SCM system of a corresponding manufacturer collectively gathers the sales information message to determine statistical data according to an exemplary embodiment of the present invention.

FIG. 4 is a signal flow diagram of a method in which, in a case where a global SCM system is implemented, a mobile terminal transmits a sales information message using an address of an SCM DB server unique for each manufacturer, and a global SCM system of a corresponding manufacturer collectively gathers the sales information message to determine statistical data according to an exemplary embodiment of the present invention.

Referring to FIG. 4, a mobile terminal 400 is initially booted after it is purchased in step 401. In step 403, the mobile terminal 400 generates and transmits a sales information message in a short message format according to whether a function for transmitting the sales information message is set. The mobile terminal 400 generates the sales information message in a short message format by gathering information about the mobile terminal such as the mobile terminal identifier information, the product information, the subscriber location information, and the like. Also, the mobile terminal 400 transmits the generated sales information message to an SCM DB server's address.

In step 405, an SMSC 410 evaluates a receiving-side address of the short message received from the mobile terminal 400. If the evaluated receiving-side address is an SCM DB server address unique for a manufacturer, the SMSC 410 determines that the short message is not a general short message but a sales information message for determining statistical data of a corresponding manufacturer. In step 407, the SMSC 410 transmits the sales information message to an SCM DB server 420 whose address is equal to the evaluated receiving-side address.

In step 409, the SCM DB server 420 gathers the sales information message from the SMSC 410 for each operator. In step 411, the SCM DB server 420 transmits the gathered sales information message for each operator to a global SCM system 430 of a corresponding manufacturer.

In step 413 and step 415, the global SCM system 430 determines statistical data using the sales information message provided from the SCM DB server 420 for each operator. That is, the global SCM system 430 determines statistical data regarding a time of sales of the mobile terminal 400 by recognizing a time of receiving the sales information message in step 413, and determines statistical data for regionally or nationally preferred models and colors of the mobile terminal 400 using a model name, a color code, and subscriber location information included in the sales information message in step 415. In step 417, the global SCM system 430 utilizes the determined statistical data as marketing information or utilizes the determined statistical data for point-of-sales inventory management by performing demand prediction.

When the general SCM system is implemented, the mobile terminal may also transmit the sales information message using an address of an SCM DB server unique for each operator as the receiving-side address. In this case, the SMSC evaluates a receiving-side address of the short message received from the mobile terminal. If the evaluated receiving-side address is an address of an SCM DB server unique for each operator, the SMSC determines that the short message is not a general short message but a sales information message for determining statistical data of a corresponding operator. Further, the SMSC may transmit the sales information message to an SCM DB server whose address is the evaluated receiving-side address. In this case, the SCM DB server transmits the sales information message from the SMSC to the general SCM system of a corresponding operator. Thus, the general SCM system of the corresponding operator may determine statistical data by gathering the sales information message from mobile terminals In an exemplary embodiment of the present invention, a determination is made as to whether transmission of information about the mobile terminal, such as the mobile terminal identifier information, the product information, the subscriber location information, and the like is a privacy violation by law. In another exemplary implementation, it may be ensured that a cost generated by transmission of the sales information message is not paid by a user but is paid by an operator if the operator implements a general SCM system or by a manufacturer if the manufacturer implements a global SCM system.

In accordance with exemplary embodiments of the present invention, a mobile terminal generates a sales information message for determining statistical data by gathering information about the mobile terminal such as mobile terminal identifier information, product information, subscriber location information and the like according to whether a function for transmitting the sales information message is set when booting is initially performed after purchasing, and transmits the generated sales information message. Therefore, there is an advantage in that SCM, which is emerging as a management scheme used by manufacturers of the mobile terminal, may be effectively operated. That is, an SCM system is reliably implemented in advance and gathers the sales information message on a real time basis to recognize a time of receiving the sales information message. Thus, the SCM system determines statistical data regarding a time of sales of the mobile terminal. Further, the SCM system may determine statistical data for regionally or nationally preferred models and colors of the mobile terminal using a model name, a color code, and subscriber location information included in the sales information message. In addition, the determined statistical data may be utilized as marketing information or may be usefully utilized for point-of-sales inventory management by performing demand prediction.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of transmitting a sales information message of a mobile terminal, the method comprising:
   upon detection of initial booting of the mobile terminal after being purchased, determining whether a function for transmitting a sales information message is set;
   in response to determining that the function for transmitting the sales information message is set, reading at least one of mobile terminal identifier information, product information, and subscriber location information from a memory of the mobile terminal;
   generating the sales information message comprising the read information;
   transmitting the generated sales information message using an address of a Supply Chain Management (SCM) database server unique for a corresponding manufacturer of the mobile terminal; and
   in response to the transmission of the sales information message, releasing, by a controller of the mobile terminal, the function for transmitting the sales information message,
   wherein the mobile terminal identifier information, the product information, and the subscriber location information are unique information of the mobile terminal and are pre-stored in the memory of the mobile terminal, and
   wherein the sales information in the message is used as statistical data in the SCM database server.

2. The method of claim 1, wherein the mobile terminal identifier information comprises at least one of an International Mobile station Equipment Identity (IMEI) and an Electronics Serial Number (ESN).

3. The method of claim 1, wherein the product information comprises at least one of a model name, a color code, an operator code and a market type.

4. The method of claim 1, wherein the subscriber location information comprises cell IDentifier (ID) of a base station to which a subscriber belongs.

5. The method of claim 1, wherein the sales information message comprises a short message, and is transmitted to a Short Message Service Center (SMSC).

6. An apparatus for transmitting a sales information message in a mobile terminal, the apparatus comprising:
   a storage unit programmed to store at least one of mobile terminal identifier information, product information, and subscriber location information;
   a controller programmed to:
      upon detection of initial booting of the mobile terminal after being purchased, determine whether a function for transmitting a sales information message is set; and
      in response to determining that the function for transmitting the sales information message is set, read any one of the mobile terminal identifier information, the product information, and the subscriber location information from the storage unit;
   a sales information message generator/transmitter programmed to:
      generate the sales information message by gathering the read information; and
      transmit the generated sales information message using an address of a Supply Chain Management (SCM) database server unique for a corresponding manufacturer of the mobile terminal,
   wherein the controller is further programmed to, in response to transmission of the sales information message, release the function for transmitting the sales information message,
   wherein the mobile terminal identifier information, the product information, and the subscriber location information are unique information of the mobile terminal and are pre-stored in the memory of the mobile terminal, and
   wherein the sales information in the message is used as statistical data in the SCM database server.

7. The apparatus of claim 6, wherein the mobile terminal identifier information comprises at least one of an International Mobile station Equipment Identity (IMEI) and an Electronics Serial Number (ESN).

8. The apparatus of claim 6, wherein the product information comprises at least one of a model name, a color code, an operator code and a market type.

9. The apparatus of claim 6, wherein the subscriber location information comprises a cell IDentifier (ID) of a base station to which a subscriber belongs.

10. The apparatus of claim 6, wherein the sales information message comprises a short message, and is transmitted to a Short Message Service Center (SMSC).

* * * * *